United States Patent [19]
Fraier

[11] Patent Number: 4,796,090
[45] Date of Patent: Jan. 3, 1989

[54] RECONNAISSANCE SYSTEM

[76] Inventor: Israel Fraier, 22 Shmaryahu St., Rishon Lezion, Israel

[21] Appl. No.: 912,524

[22] Filed: Sep. 29, 1986

Related U.S. Application Data

[63] Continuation-in-part of Ser. No. 773,132, Sep. 6, 1985, abandoned.

[30] Foreign Application Priority Data

Sep. 6, 1984 [IL] Israel ............................ 72878

[51] Int. Cl.$^4$ ............................................. H04N 7/18
[52] U.S. Cl. ................................ 358/211; 358/109; 358/222
[58] Field of Search ............... 358/211, 209, 93, 109, 358/222, 95, 108

[56] References Cited

U.S. PATENT DOCUMENTS

| | | | |
|---|---|---|---|
| 3,096,484 | 7/1963 | Clark | 358/211 |
| 3,217,099 | 11/1965 | Gebel | 358/211 |
| 3,902,803 | 9/1975 | Lego | 358/95 |
| 4,387,391 | 6/1983 | Hecker | 358/109 |

OTHER PUBLICATIONS

J. Inst. Tele. Eng. Japan, vol. 24, No. 1, Jan. 1970, pp. 36–43, "A Narrow Band Television System with Electronic Shutter and Image Motion Compensator".
Proceedings of the Society of Photo-Optical Instrumentation Engineers, Reston, Va., U.S.A., Mar. 24–25, 1976, pp. 161–167, "The AN/UXD-1 Electronic Camera".

Primary Examiner—Howard W. Britton
Attorney, Agent, or Firm—Fleit, Jacobson, Cohn & Price

[57] ABSTRACT

The invention relates to improvements in airborne, marine, and/or moving vehicle-carried, stabilized high resolution long-range surveillance systems, which are based on a stabilized platform, TV cameras and a lens with a relatively long focal length. The improvement overcomes almost absolutely the problems due to residual remaining vibrations that are inherent in the stabilized platform. The system comprises mechanical stabilizing structure adapted to reduce vibrations and especially to eliminate or at least drastically reduce high frequency vibrations, a TV sensor, optionally including or coupled in intensifying electro-optical imaging structure, an optical lens and exposure control structure so as to record the image on the sensor for a period of time which is much shorter than the usual television frame time.

11 Claims, 6 Drawing Sheets

RECONNAISSANCE SYSTEM

RELATION TO OTHER APPLICATIONS:

This patent application is a continuation-in-part (CIP) application of U.S. patent application Ser. No. 773,132 filed Sept. 6, 1985, now abandoned.

FIELD OF THE INVENTION

The invention relates to a highly improved long range surveillance system born by a moving platform. This system can be used for imaging invisible, near IR and infra-red light. By considerably reducing high frequency vibrations to a predetermined value, and by using high resolution TV sensors in combination with a long focal length optical lens, sharp pictures of high resolution can be attained from long ranges. One of the features of the novel system is the recording of the image on a sensor during a period of time which is shorter than the usual television frame time.

STATE OF THE PRIOR ART

High resolution long-range TV reconnaissance systems that are situated on any kind of moving platform, suffer from the critical problem of stabilization of the line of sight. In any imaging system movement or "dancing" of the created image on the sensor photosurface during the exposure period will cause the scenery picture to become blurred beyond recognition. The origin of this blurring can be:

(1) random movements (jittering) of the line of sight about its nominal position as caused by imaging from unstable platforms;

(2) all image "dancing" relative to time or parts of image dancing relative to one another and relative to time, caused by atmospheric turbulence;

(3) fast relative movements between sensor and scene, caused by:
   (a) sensor "panned" in a search pattern,
   (b) sensor located on fast-moving vehicle, and
   (c) sensor imaging a fast moving scene.

The blurring phenomenon which is a resolution degradation effect, is well known. The image resolution degradation is almost completely described and evaluated by the optical transfer function (OTF) or modulation transfer function (MTF) related to the specific aforementioned effects.

The resolution degradation effect is most severe in high resolution systems. In most cases these are high magnification narrow field of view systems (long focal length lenses) coupled to high resolution TV sensors.

The instability of such a platform can be due to mechanical disturbance intrinsic to the vehicle (motors, internal resonances) or mechanical disturbances caused by environmental factors or by interaction between environmental factors and the vehicle (winds, streams, roads, etc.). Those mechanical disturbances can act directly on the system platform (winds and marginal air flow in an aerial vehicle environment) or throw of the vehicle body.

There is a well known method for diminishing image blurring caused by linear fast relative movements between sensor and scene. This method is to shorten the exposure time and is applied in fast film photography and in fast event/real time photograph using pulsed active illumination and gated sensors. From basic reasoning it is clear that the mere shortening of exposure time will not bring about a pronounced improvement of a picture quality affected by blurring whose origin is jittering of the line of sight of a system located on an unstabilized platform.

This is so because there is almost no positive effect if the frequency of the line of sight jittering or image dancing happens to be higher or equal to half ($\frac{1}{2}$) the inverse of the shortened exposure time. Hitherto all efforts to improve the imaging performance (resolution/range) of high resolution stabilized imaging systems were addressed and concentrated on achieving a high level of stabilization.

The highest level of stabilization achieved so far is of about 30 micro radian peak-to-peak of residual angular jittering. And even this high level of stabilization (high cost achievement) is no adequate at all in order to obtain all the available resolution of a system that uses a high resolution TV sensor of about 800 TV lines if we try to use lenses with a focal length longer than about 900 mm. Thus, there exists a limitation on the sensor resolution and the system magnification and due to it on the usable observation range of such system.

There have been described many methods and devices used to shutter film, TV or other sensors, see for example (U.S. Pat. No. 3,096,484 Clark and U.S. Pat. No. 3,217,099 by Gebel).

It is clear that decreasing the exposure time alone will not solve the problem of high resolution long-range surveillance systems carried on moving platforms which suffer from a normal wide spectrum of mechanical vibration frequencies. To the best of our knowledge, hitherto all TV long range high resolution surveillance systems are stabiliztion limited in their performance and they even do come close to the static performance (laboratory tested) of such a system.

There has been described (SPIE 79 (1979) 79 ), a CCD viewfinder as adjunct to aerial reconnaissance systems, wherein use is made of a CCD solid state sensor. The proposed system comprises a CCD sensor, a zoom lens of up to 50 mm focal length to provide a field of vision from 10° to 40° in combination with a slicing shutter, in order to reduce image smearing due to linear forward motion at high vehicle (V/H) rate. For the intended purpose, such exposure times result in the desired picture quality at high vehicle, V/H rate and it is stated that stabilization or compensation for vehicle motion is unnecessary. The statement that shortening the exposure time to a reasonable time interval makes stabilization unnecessary, is not correct in principle because all high frequency vibrations will affect the picture quality even at short exposure times. It is clear that this does not eliminate the problem of blurring due to vibrations. The problems of exposure control as such have been solved long ago but this does not solve by itself the problem of limited resolution in very long range observation systems which are on a moving platform subject to vibration disturbances.

SUMMARY OF THE INVENTION

The present invention relates to a method of real time imaging and to a novel system adapted to overcome almost completely the drawbacks and problems caused by vibrations of the line of sight on the resolution of a picture obtained via a TV camera or any staring array sensor and an optical lens, especially with lenses of long focal length and high resolution TV sensors. The proble of image due to insufficient stabilization is overcome almost completely by the method of the invention and by the novel system for carrying out such method.

Efficient stabilization, especially intended to drastically reduce disturbances of frequencies above 30–40 Hz even at the expense of increasing low frequency disturbances is used as part of the system of the present invention, providing better than about 10 rad peak-to-peak stabilization in the frequency range of higher than about 30 Hz to 40 Hz.

According to the present invention there is provided a method of high resolution real time imaging and a system for carrying out such method. The method of the invention and system for carrying it out, make it possible to obtain a sharp picture revealing the required details, eliminating the blurring encountered with conventional systems.

When imaging in the visible and IR light, the imaging performance is extended into the moderate low light level region of target illuminance when the system is provided with light intensifier means.

As all reconnaissance systems are limited in their performance in a very drastic manner by the degree of stabilization, and as the system of the present invention permits a substantial increase of the observation range of systems based on TV cameras and staring sensor arrays, the system has substantial practical utility.

Worst-case computations prove that the system of the invention drastically, almost completely overcomes the problem of vibrational disturbances. The novel yystem is based on the combination of a specially adapted stabilizing system (passive shock absorbers plus active gyro or accelerometer activated feedback loop) that eliminates or strongly attenuates high frequency jittering and exposure (picture recording) time control element.

The stabilization system and means are suited to eliminate the high frequencies of above about 30–40 Hz vibrations of the line of sight or at least to reduce the angular amplitude of such vibrations to a level of less than about 10 $\mu$-radian peak-to-peak.

The aim of the exposure (picture recording) time control element is to eliminate the image degradation caused by low frequency of below about 40–50 Hz vibrations of the line of sight by reducing the instantaneous displacement of the line of sight which is recorded in the TV image.

More particularly, the invention relates to an electro-optical stabilized system comprising an electro-optical (UV, Visible and near IR) TV imaging device or staring array sensor optionally provided with intensifier means for use at low light level and an exposure control element or device and synchronization circuit, in combination with specially adapted high efficiency stabilization means. The novel system provides a high resolution surveillance and attack, real time imaging capability of high quality performance. In most cases these are high resolution and high magnifiaation, narrow field of view (long focal length lens) systems whose performance (reslution range) is hitherto seriously hampered by the lack of an adequate line-of-sight stabilization level. The intensifying imaging device can be an "in sensor" electronic intensifier as in LLLTV Tube or a two part device composed from an external intensifier as a micro-channel plate i.e., MCP intensifier attached to an ordinary imaging sensor tube or solid state sensor, CCD, MOS, CID, etc. Tee exposure control device can be a motor-driven mechanical shutter or an electro-mechanical (solenoid) shutter or an electro-optical effect device shutter, or switching means that acts on the intensifying device or on the solid-state sensor, and creates an exposure shuttering effect. The synchronization circuit is needed to maintain an accurate period between the shutter successive openings and/or to synchronize the shutter opening and frame scanning to one another.

The novel system according to the invention comprises sensor exposure control means for recording the image onto a suitable TV-sensor during a period of time substantially shorter than the conventional scanning time of the sensor. The exposure time of the TV-sensor per frame will be reduced from the generally accepted period of about 1/30 seconds or other TV standard frame time to a period of time substantially less than such frametime, generally of about 1/250 to 1/10,000 sec. The novel system comprises also means for reducing as far as possible high frequency disturbances (at frequencies larger than about 30–40 Hz). This can be accomplished by resorting to a specially adapted design of a passive and/or active stabilization means, the degree of stabilization being to less than about 10$\mu$-rad peak-to-peak at frequencies higher than about 30–40 Hz. Such stabilization ca be attained by specially adapted conventional stabilization means.

Many of the inherent drawbacks of high resolution long range observation systems, which cannot even be overcome by the most expensive and sophisticated mechanical stabilization systems, can be overcome almost completely, resulting in a considerably increased picture resolution and range. Residual vibration (MTF) will not adversely affect the resolution-range.

The novel system for use in optical surveillance systems mounted on a moving carrier, comprises stabilization means effective at high frequencies, a TV sensor, optionally a low level TV, suitable long focal length optical lens means to expose the sensor to the target image or to record the image via the lens during a period of time substantially shorter than the normal frame time of said sensor. The means interposed between this lens and sensor or on the sensor can be a suitable shutter or any other devic which achieves the same result as such shutter, switching means device on the intensifier or on the sensor, etc. The stabilization means ought to perform better than about 10 $\mu$rad residual jittering at above 30–40 Hz disturbances. Each image is scanned during 1/30 seconds or at 1/25 or any standard TV scan-time. If any vibration takes place during this period of time, blurring occurs resulting in a low quality picture which may even be without any value.

Conventional stabilization systems are complicated and expensive, and it is practically impossible to attain a degree higher than of a 30$\mu$-radian peak-to-peak stabilization. If such system is mounted for example on an aircraft vehicle or other carrier, the vibrations of the motor and wing cause serious troubles. When light has to pass a long path at low altitudes, blurring occuss also due to atmospheric turbulance. Generally, according to Johnson criteria, one has to have 6,4 line pairs on the target for its identification. Conventional sensors for example, are of the 6.6×8.8 mm or the 9.6×12.7 mm size ($\frac{3}{3}$" or 1" size) and horizontal resolution of up to 1600 TV Lines; there also already exist solid state sensors with about 800×800 sensor elements or 780×488 sensor elements (PIXELS). Regarding this relatively high resolution of those sensors and the long focal length lenses in use the system concept and configuration of the invention result in a very high system resolution performance attained at the already achievable degree of stabilization . Those performances are impossible to be attained in conventional systems by any known stabilization levels achieved so far.

The advantageous results are attained due to the combination of the use of specially adapted stabilization means which eliminate or at least substantially reduce high frequency vibrations (above about 30 to 40 Hz), and by resorting to an appropriate exposure time which is substantially shorter than standard TV frametimes. The new concept and related system of the invention make it possible to provide high resolution real time imaging whereby the residual lack of stabilization at low frequencies causes image blurring is substantially reduced by shortening the exposure time. Known systems did not address the problem of residual unstabilization in stabilized long range systems and did not pay special attention to the frequencies of the residual jittering. The specially designed stabilization/damping system will substantially reduce the high frequency part of the stabilization disturbances to a level which can be tolerated by such high resolution real time system. This sytem makes possible to achieve high resolution real time imaging.

It is thus possible to overcome the otherwise unbeatable performance (resolution/range) limitations imposed on those high resolution real time imaging systems by the so far achievable stabilization level.

DETAILED DESCRIPTION OF THE INVENTION

The system of the invention and results attained by such system are illustrated with reference to the enclosed Figures, in which.

It is possible to overcome the limits imposed by stabilization of the order of about 30 $\mu$-radian peak-to-peak and this makes possible the effective use of optical lenses of very large focal length rather than of about 900 mm focal length beyond which one gets no additional image resolution in airborne or moving vehicle applications.

For example, it is possible to take a very high resolution system which comprises a 2000 mm lens and a high resolution TV tube or CCD Camera and which is stabilized to the almost unachievable value of 30 micro radian peak-to-peak residual jittering, and to substantially improve it.

Let us assume that by a special stabilization system design we will achieve the following residual unstabilization (Jittering) levels at low frequencies, and less than 10 $\mu$rad peak-to-peak jittering at higher frequencies, (Hz):

| Jittering frequency (Hz) | 10 | 25 | 30 | 35 | 40 |
|---|---|---|---|---|---|
| Residual unstabilization $\mu$rad peak-to-peak | 30 | 30 | 25 | 20 | 15 |

Results are illustrated by Graphs 1, 2, 3, 4 and 5.

The available TV sensor resolution of any ordinary TV camera is at least 25 LP/mm (line pairs) per millimeter on TV sensor faceplate. It is strongly emphasized that the very long range high resolution uurveillance systems suffer from a very low modulation contrast due to the long atmospheric path attenuation and due to turbulence. Thus, in order not to lose the weak signal that reaches the TV sensor, the stabilization MTF (Modulation Transfer Function) that will multiply the poor (low) atmospheric MTF must be high and at least about 80% at the usable spatial frequency of the system, i.e. 25 LP/mm.

Going back to our system we shall calculate the stabilization MTF for the standard frame time of 1/30 sec/frame and for a short exposure time of 1/350 sec/frame according to our improved system.

The stabilization MTF results are described in Graphs 1 to 5. (FIGS. 2–6) For the short exposures T=1/350 sec, we will calculate the worst case (maximum displacement due to vibration MTF as a linear image motion):

$$MTF = \sin(\pi \cdot S.F \cdot D)/\pi \cdot S.F \cdot D) \qquad (I)$$

$$D = X \cdot F \sin(2\pi f \frac{T}{2})$$

S.F: spacial frequency (lines/mm).
f: residual jittering frequency
F: focal length
X: amplitude in rad
T: time exposure For the long exposure T=1/30 sec, we will calculate the MTF for jittering frequencies higher than 10 Hz:

$$MTF = Io(\pi S.F. F.X) \qquad (II)$$

Io: Bessel function of zero order.

For the 10 Hz jittering frequency we will use the (1) MTF.

It is clear from the graphs that for the 1/30 sec/frame, the system is almost "blind" for spatial frequencies which are substantially lower than the ordinary resolution of TV cameras.

The combination of a special stabilization system design for suppression of high frequency jittering above about 30–40 Hz and a moderately shorter exposure time of 1/350 sec/frame the result is higher than 80% MTF for all relevant spatial freuuencies up to 27 LP/mm. It is clear from the graphs that with a proper stabilization high frequency suppressing design and adequate exposure time, we can almost completely eliminate the stabilization problem that had hampered so much long-range surveillance system performances.

It is clear that with a less efficient low frequency stabilization or with longer focal length lenses, the improvement will be more spectacular.

The LP/mm resolution on the sensor is directly related to the angular resolution of th system (through the focal length) and directly affects the achievable observation range of the system.

It is clear that there exists a wide range of exposure time possibilities from which one can make an optimization according to the specific system and mission data: focal length and stabilization level at low and high frequencies.

In order to get normal TV pictures at exposure time shorter than the recprocal of the specific TV standard frame rate (30 Hz, 25 Hz, or other), we have to assure one of the two:
(a) shutter frequency control better than the line scan time, which means that for a 30 Hz system the frequency control must be better than 0.07%. In a mechanical rotating shutter this can be achieved by a suitable encoder and speed control loop. In electromagnetic or electro-optical shutters and in a shutter effect switching device, this can be achieved by a synchronising signal.

(b) synchronization;
 (1) between the opening of the shutter and the beginning of the TV frame scan (with an adequate delay);
 (2) between the end of the field scan and the opening of the shutter of the start of the integration time on the sensor. This synchronization can be performed by using the TV camera synchronization signals (or the main clock in a solid state camera) and in the first case also by using a position measuring sensor on the shutter (mechanical or electromechanical).

The advantages of the novel system and the related operating concept of the invention is that it permits to overcome the conventional stabilization limitations imposed by the level of stabilization on high resolution long-range real time daylight level imaging systems.

As a by-product, shortening exposure time can remove part of the blurring caused by atmospheric turbulence because the phenomena causing image "dancing" on the photo surface is partially a time-dependent effect.

The novel surveillance system is of crucial importance to missions of high resolution long-range aerial marine or ground moving vehicles surveillance. Daylight, near-IR and IR-imaging systems used in these missions are always stabilization limited in their performance (resolution/range) because of either:

(a) limited stabilization level accepted because of the cost, technical complexity, and complex maintainability required to achieve an adequate level of stabilization; for example, mini-RPV surveillance payloads;

(b) unachievable (whatever the cost) stabilization levels that are needed for high resolution long-range of long focal length optic) missions.

The novel system can comprise lenses of very long focal length, giving high resolution pictures.

The system of the invention removes the limitations imposed by conventional stabilization levels and permits to achieve much higher performances at almost the same cost as conventional systems.

Figure 1:
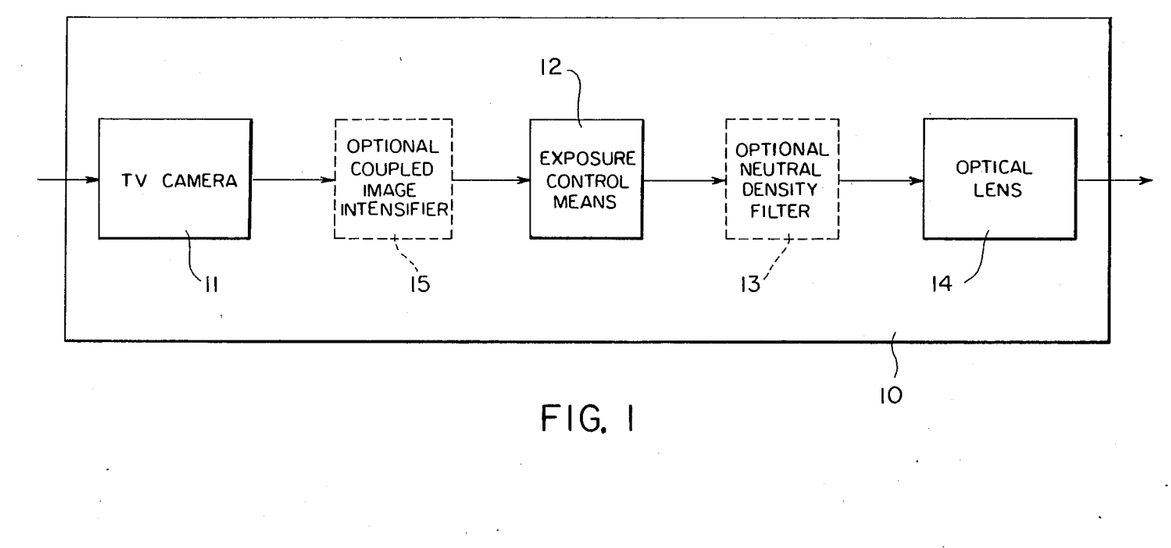
FIG. 1 is a block diagram of a system of the invention.
Figure 2:
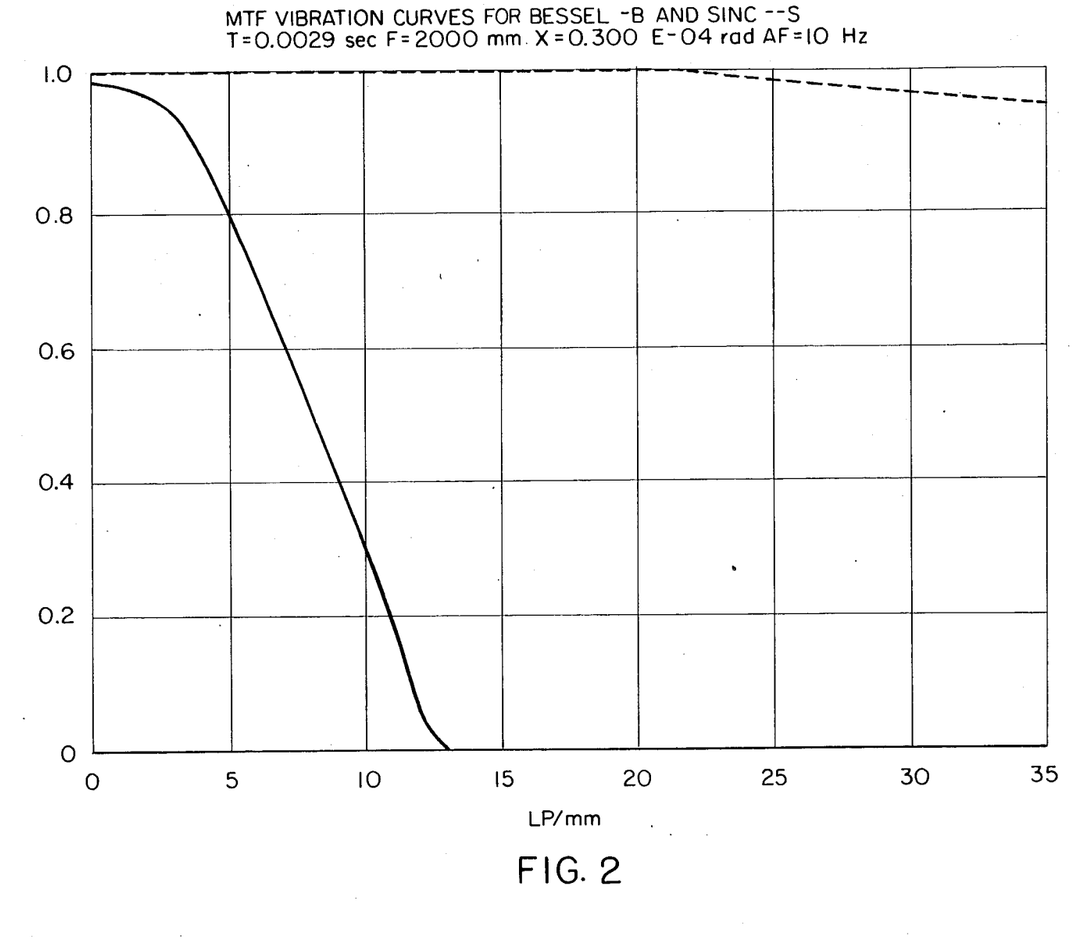
FIGS. 2, 3, 4, 5 and 6, are graphs of the MTF versus resolution, at various jittering amplitudes and frequencies.
Figure 3:
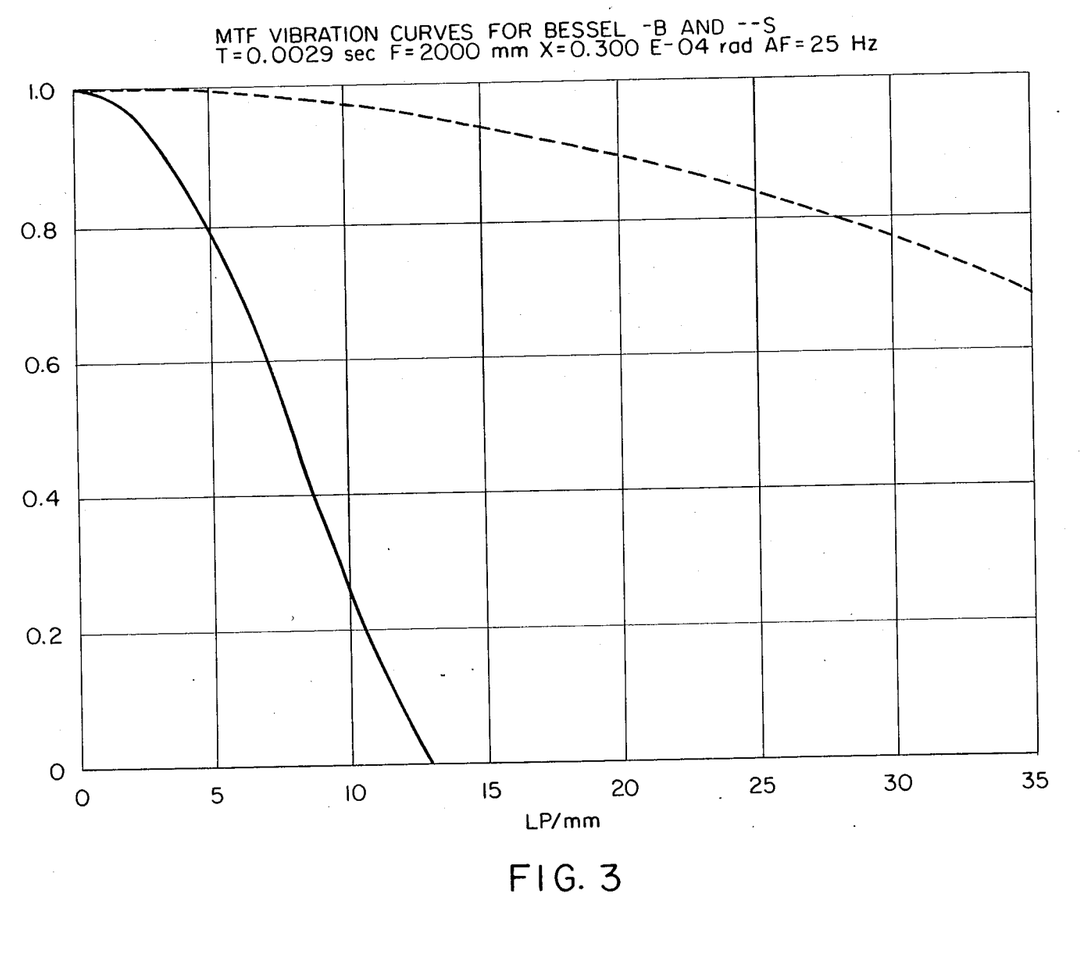
Figure 4:
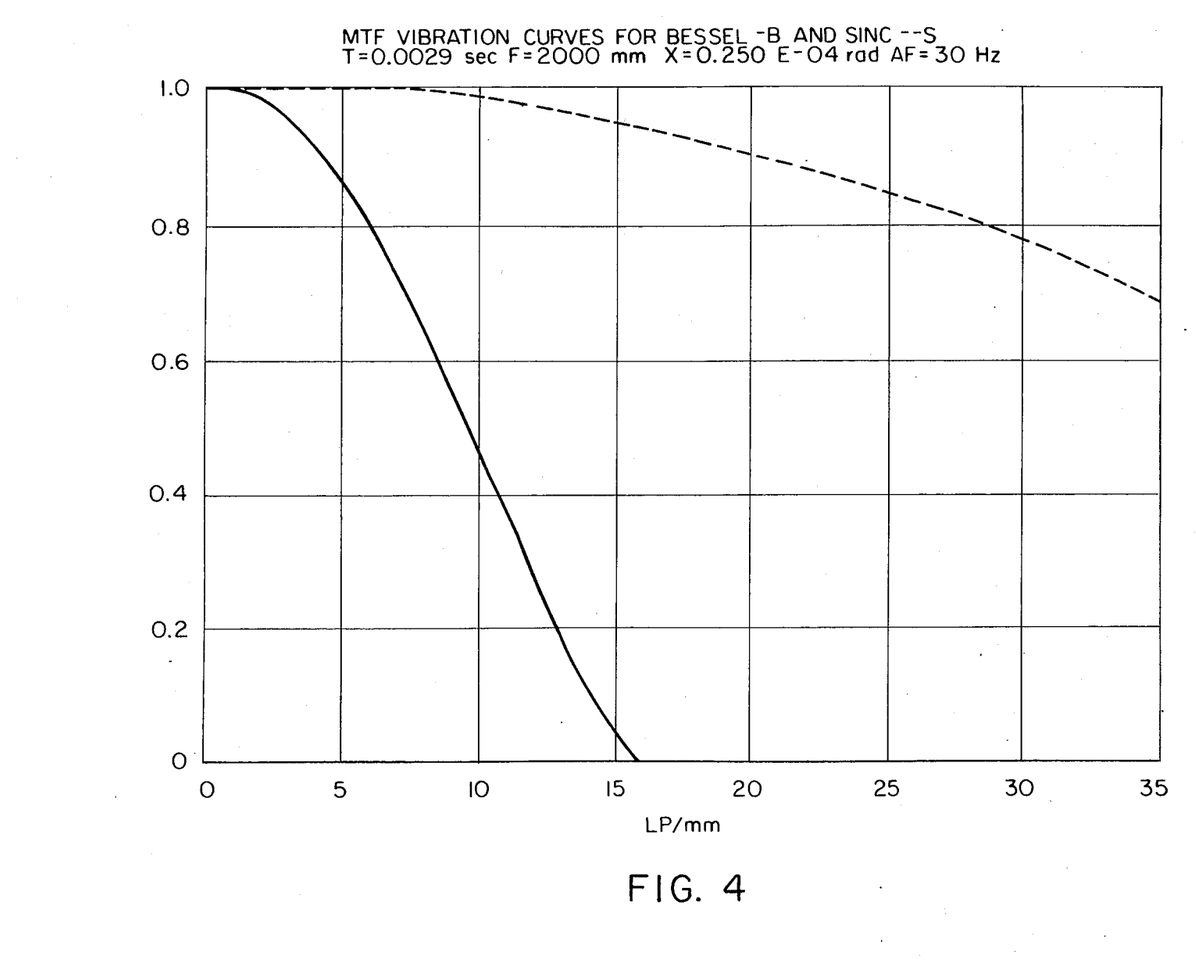
Figure 5:
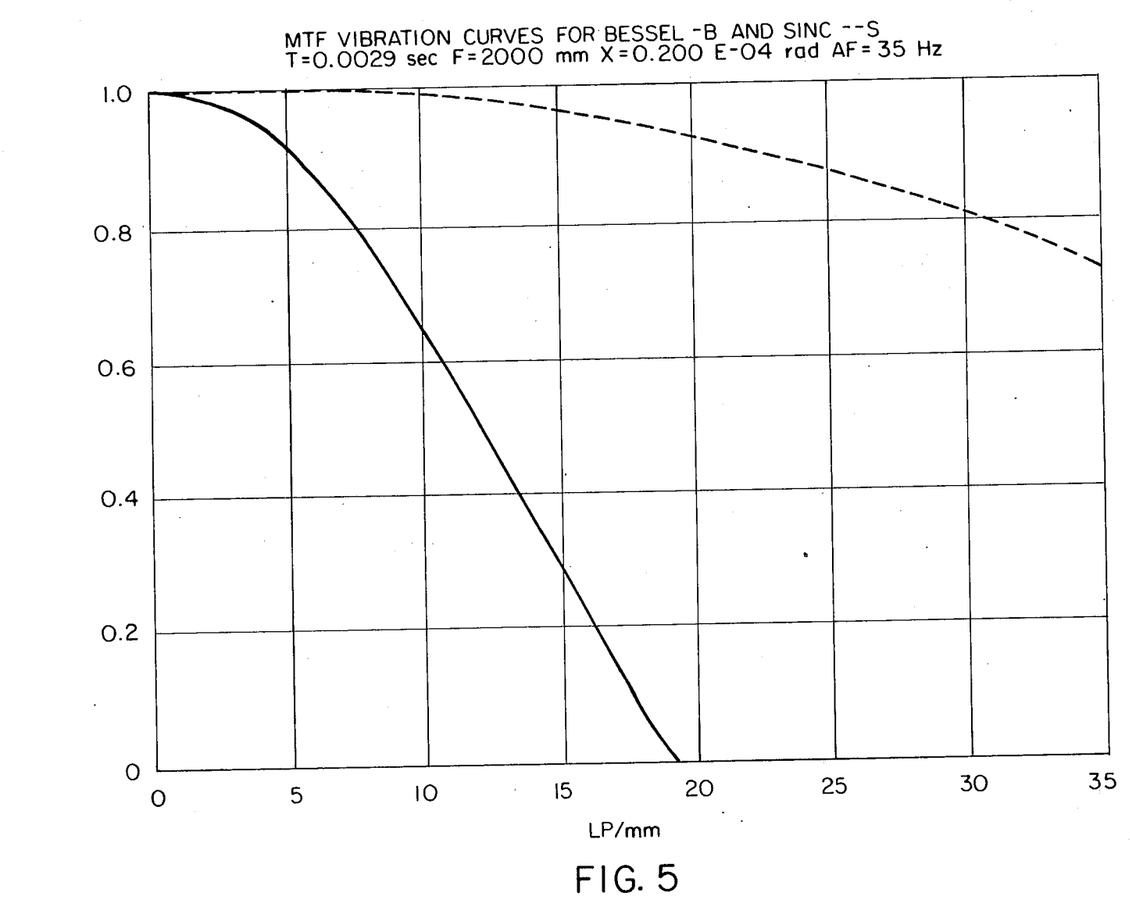
Figure 6:
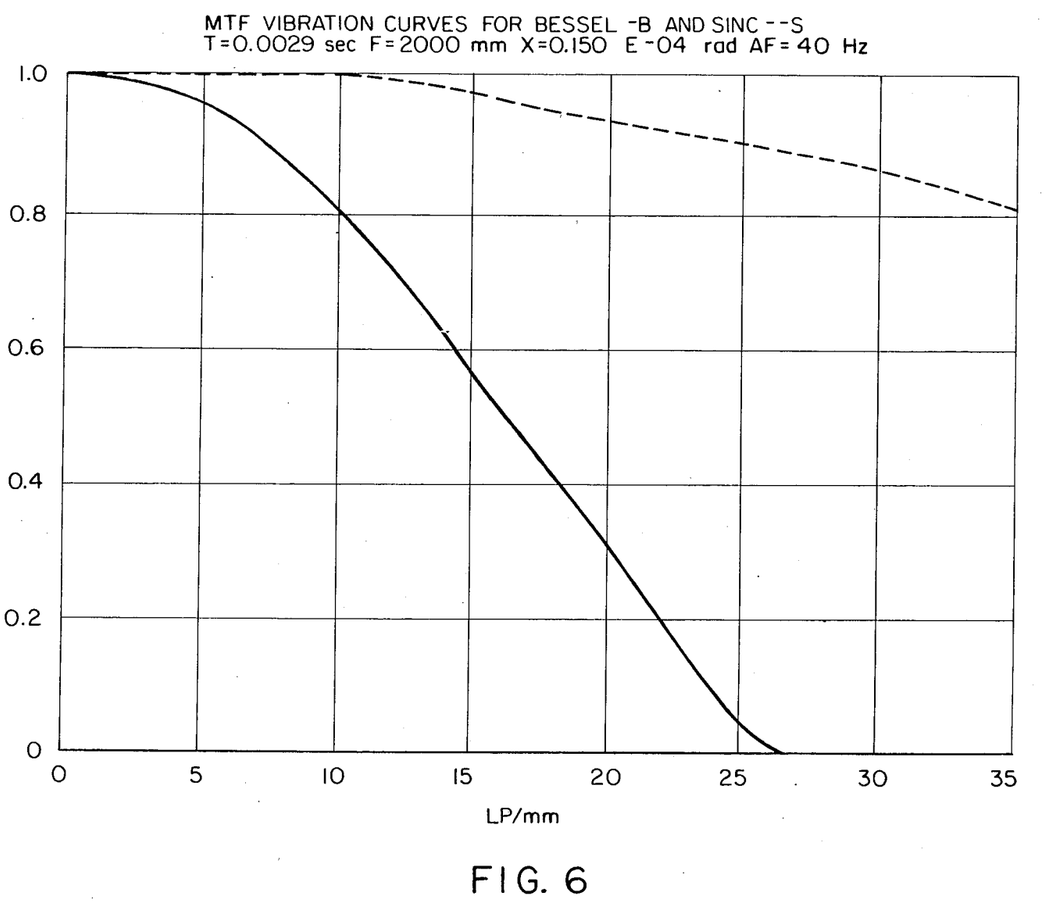

The enclosed FIG. 1 is a block diagram of an imaging system according to the invention.

As illustrated in FIG. 1, the system comprises stabilizing means, 10, in combination with a TV camera 11, (TV tube camera, CCD camera, MOS camera, CID camera) or any type of LLTV camera (low light level TV camera) or any staring array sensor. This may comprise as optional feature variable integration switching means or variable frame rate control means for shortening frame image integration time. The camera is aligned on the optical axis with exposure control means 12, in case the image recording time control is not performed on the sensor. with an optional neutral density filter 13, and with an optical lens, 14. The TV camera can be used in conjunction with the optional coupled image intensifier, i.e. (MPC) 15. The exposure control means can be a mechanical shutter, an alectro-mechanical shutter (solenoid), a switching effect device incorporated in the TV camera or in the sensor, or a device based on electro-optical effects, such as PLZT or liquid crystal. The exposure control means 12, will not be necessary if there is used an intensifier 15, with rapid switching capabilities or if the frame image recording time control is performed in the sensor.

The lens 14 can be of a long focal length, the focal length exceeding that used nowadays because of the restrictions imposed by the blurring due to the various causes set out above.

Focal lengths well above the 900 mm range can be used without problems as to picture quality, and with full exploitation of TV sensor resolution.

It is clear that any other setup of components which results in recording the image on the TV sensor or any staring array sensor during a period of time shorter than that of the conventional scan time, in combination with a specially adapted design of a high frequency suppression stabilization system and a suitable lens, can be used to provide a system according to the invention.

It is also within the scope of the invention to resort to a brief exposure of the TV tube (or equivalent), and to effect a scan at a higher speed than usual, the condition being that the $10\mu$-radian or less peak-to-peak stabilization is attained at frequencies higher than about 30–40 Hz.

I claim:

1. A real time reconnaisance (surveillance) system adapted to be mounted on a moving aerial, ground or marine platform which provides very high resolution and high quality imaging, said system comprising in combination:
 means for substantially eliminating or drastically reducing high frequency vibrations at frequencies higher than about the 30 to 40 Hz range, to a level of less than about 10 $\mu$rad peak to peak; TV electrooptical or staring arrays sensor means;
 an optical lens of a focus of at least 300 mm;
 exposure control means adapted to record or expose the target image on the said sensor for a period of time substantially shorter than the conventional frame time of the said sensors.

2. A system according to claim 1, where the stablization means substantially reduces vibrations in the highter than about 30–40 Hz range to a level of less than 10 $\mu$rad peak-to-peak.

3. A system according to claim 1, where the sensor exposure time is at least 1/250 second and up to about 1/10,000 second.

4. A system according to claim 1 where the focal length of the lens is from 300 to 3,000 mm.

5. A system according to claim 1, where the sensor is an ordinary tube TV camera.

6. A system according to claim 1, where the sensor is an LLTV tubes camers.

7. A system according to claim 1, where the sensor is a solid state sensor optionally coupled to intensifying means.

8. A system according to claim 6 or 7 provided with electro-optical image intensifying means.

9. A real time reconnaisance (surveillance) method providing very high resolution and high quality target imaging, unattainable by conventional TV surveillance systems, by means of a moving platform reconnaissance system which comprises:
 stabilizing the system so as to drastically reduce vibrations of frequency of higher than about 30–40 Hz to a level of about 10 $\mu$rad peak to peak jittering amplitude;
 directing a long focal length optical lens coupled to a TV imaging system at the target;
 recording the image on the sensor for an exposure time shorter than the conventional frame times of TV cameras, and generally of the order of 1/250 second or less, and evaluating the image.

10. A method according to claim 9, where the exposure time is of the order of 1/250 to about 1/10,000 second.

11. A method according to claim 9, where the optical lens has a focal length of 300 mm or more.

* * * * *